(12) United States Patent  
Gross et al.

(10) Patent No.: US 8,303,034 B2
(45) Date of Patent: Nov. 6, 2012

(54) SEAT ASSEMBLY WITH BLAST MITIGATION DEVICE AND FRONT END COLLISION RESISTANCE

(75) Inventors: Matthew C. Gross, Pottstown, PA (US); Christian U. Hammarskjold, Devon, PA (US); Vincent P. Galie, Schwenksville, PA (US)

(73) Assignee: USSC Group, LLC, Exton, PA (US)

( * ) Notice: Subject to any disclaimer, the term of this patent is extended or adjusted under 35 U.S.C. 154(b) by 533 days.

(21) Appl. No.: 12/565,814

(22) Filed: Sep. 24, 2009

(65) Prior Publication Data

US 2010/0156153 A1 Jun. 24, 2010

Related U.S. Application Data

(60) Provisional application No. 61/099,587, filed on Sep. 24, 2008.

(51) Int. Cl.
*B60N 2/42* (2006.01)
(52) U.S. Cl. ................ 297/216.1; 297/216.19; 296/68.1
(58) Field of Classification Search ............... 297/216.1, 297/216.19, 216.2; 296/68.1
See application file for complete search history.

(56) References Cited

U.S. PATENT DOCUMENTS

| | | | |
|---|---|---|---|
| 3,606,452 A * | 9/1971 | Riffe | 297/216.1 |
| 4,168,819 A | 9/1979 | Ducrocq | |
| 4,784,434 A | 11/1988 | Iwami | |
| 5,662,376 A | 9/1997 | Breuer et al. | |
| 5,758,859 A | 6/1998 | Gonzalez | |
| 5,813,649 A | 9/1998 | Peterson et al. | |
| 5,876,085 A | 3/1999 | Hill | |
| 6,267,440 B1 | 7/2001 | Hoffman | |
| 6,322,140 B1 | 11/2001 | Jessup et al. | |
| 7,270,045 B1 | 9/2007 | Gonzalez | |
| 7,393,039 B2 | 7/2008 | Ravid et al. | |
| 7,735,917 B2 * | 6/2010 | Jones et al. | 297/216.1 |
| 7,883,135 B2 * | 2/2011 | Ravid et al. | 297/216.1 X |
| 2004/0169405 A1 | 9/2004 | Stinnes | |

* cited by examiner

*Primary Examiner* — Anthony D Barfield
(74) *Attorney, Agent, or Firm* — Miller, Canfield, Paddock and Stone, P.L.C.; Timothy J. Engling

(57) ABSTRACT

A seat assembly having a front and a back and adapted to be attached to a floor comprises a seat base and a seat back attached to the seat base, a seat belt mechanism attached to the seat base and free of the floor, a blast mitigation device attached to the seat base and adapted to be secured to the floor, wherein the blast mitigation device has a crumple zone which absorbs energy in the event of a blast, and a front impact dislocation resistance device mounted on the blast mitigation device with a pair of brackets. The front impact dislocation resistance device acts to resist separation of the seat base from the blast mitigation device.

10 Claims, 8 Drawing Sheets

SEAT ASSEMBLY WITH BLAST MITIGATION DEVICE AND FRONT END COLLISION RESISTANCE

RELATED APPLICATION

This application claims priority benefit of U.S. provisional patent application No. 61/099,587 filed on Sep. 24, 2008.

FIELD OF THE INVENTION

This invention relates to improvements in seat assemblies, and more particularly to seat assemblies with blast mitigation components and front end collision resistance.

BACKGROUND OF THE INVENTION

Although armor plating has improved significantly over the past several decades, such exterior plating is insufficient to withstand the intense shock or loading transferred to the interior of the vehicle as a result of a exploding mine. To address this, some seat assemblies are provided with blast mitigation components such as, for example a blast box that collapses under the vertical impact of an IED, mine, or other explosive device. The collapse is controlled in the sense that it is desired to absorb a certain amount of energy and thereby help protect the occupant of the vehicle.

Known seat assemblies mounted to such blast mitigation devices cannot readily be configured with integrated or All belts to seat (ABTS) restraints such that the assembly passes frontal crash force regulatory requirements, such as the U.S. FMVSS requirements (207, 208, 210). ABTS seat assemblies are seat assemblies where all seat belt mechanisms are affixed to the seat instead of mounted on the floor, the roof, or a side pillar of the vehicle (commonly called vehicle mounted restraints). It would be desirable to provide a seat assembly with blast mitigation which also has ABTS and is sufficiently strong to meet regulatory requirements.

SUMMARY OF THE INVENTION

In accordance with a first aspect, a seat assembly having a front and a back and adapted to be attached to a floor comprises a seat base and a seat back attached to the seat base, a seat belt mechanism attached to the seat base and free of the floor, a blast mitigation device attached to the seat base and adapted to be secured to the floor, wherein the blast mitigation device has a crumple zone which absorbs energy in the event of a blast, and a front impact dislocation resistance device mounted on the blast mitigation device with a pair of brackets. The front impact dislocation resistance device acts to resist separation of the seat base from the blast mitigation device.

From the foregoing disclosure and the following more detailed description of various preferred embodiments it will be apparent to those skilled in the art that the present invention provides a significant advance in the technology of seat assemblies. Particularly significant in this regard is the potential the invention affords for providing a high quality, low cost seat assembly with enhanced blast protection and resistance to front end collisions. Additional features and advantages of various embodiments will be better understood in view of the detailed description provided below.

Figure 1:
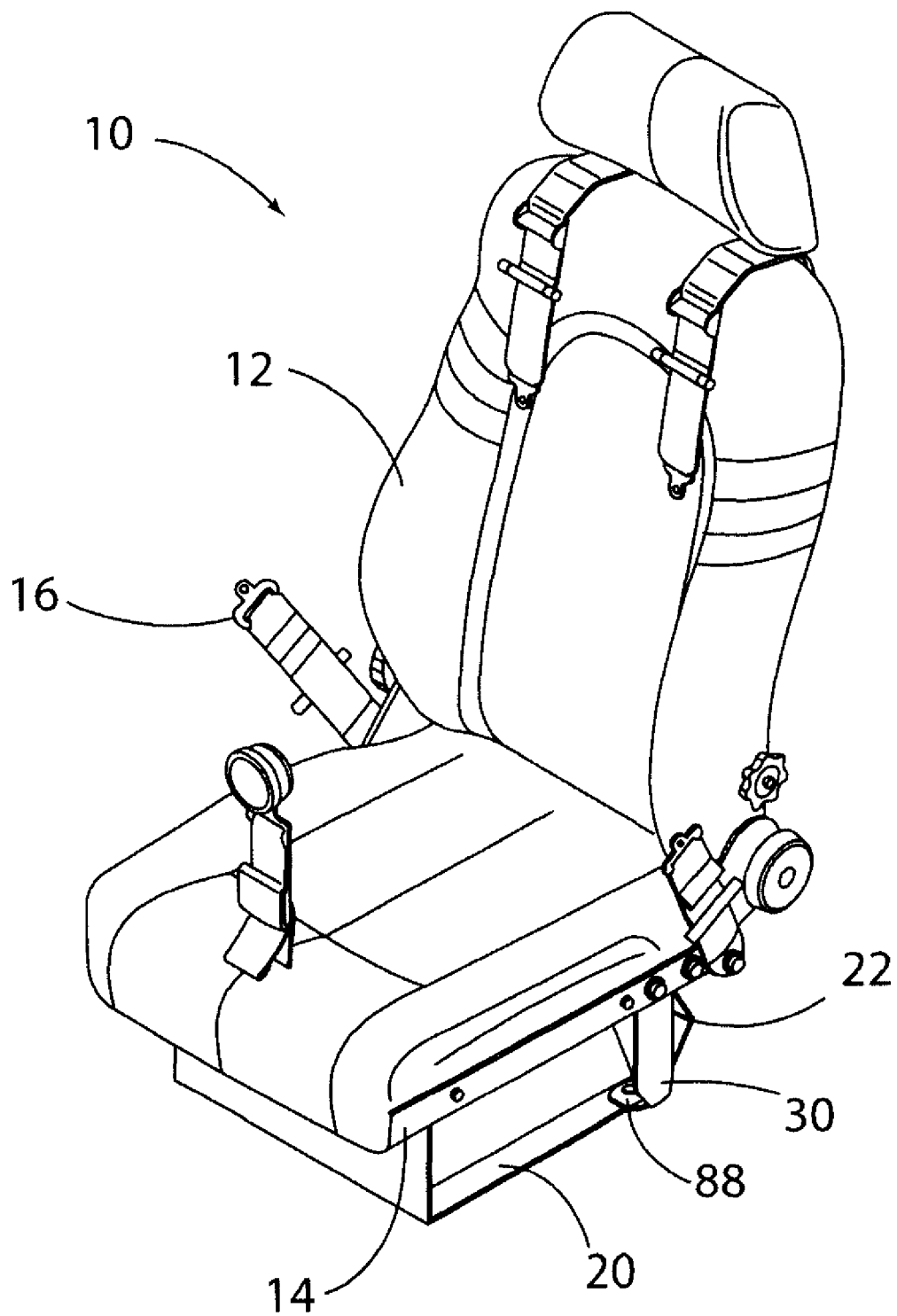
FIG. 1 is an isometric view of a seat assembly in accordance with one embodiment showing a blast mitigation device and a front impact dislocation resistance device.

It should be understood that the appended drawings are not necessarily to scale, presenting a somewhat simplified representation of various features illustrative of the basic principles of the invention. The specific design features of the seat assembly as disclosed here, including, for example, the specific dimensions of the blast mitigation device, will be determined in part by the particular intended application and use environment. Certain features of the illustrated embodiments have been enlarged or distorted relative to others to improve visualization and clear understanding. In particular, thin features may be thickened, for example, for clarity of illustration. All references to direction and position, unless otherwise indicated, refer to the orientation illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the seat assembly disclosed here. The following detailed discussion of various alternative and preferred features and embodiments will illustrate the general principles of the invention with reference to a seat assembly suitable for use in a motorized vehicle. Other embodiments suitable for other applications will be apparent to those skilled in the art given the benefit of this disclosure.

Referring now to the drawings, FIG. 1 shows an isometric view of a seat assembly 10 having a seat back 12 and a seat base 14, each preferably provided with foam and fabric. Optionally the seat back 12 may be pivotable with respect to the seat base 14, as shown. The seat base 14 is mounted on a blast mitigation device, shown here as blast box 20. Thus, the seat base is not mounted directly to the floor. A seat belt mechanism 16 comprising one or more lap belts and shoulder belts is affixed to the seat base. Preferably the seat assembly 10 is constructed as an all-belts-to-seat (ABTS) module, where all functional components of the seat belt assembly 16 are mounted to the seat base 14 free of the floor, and the blast box 20 is the only component mounted to a vehicle floor.

Figure 2:
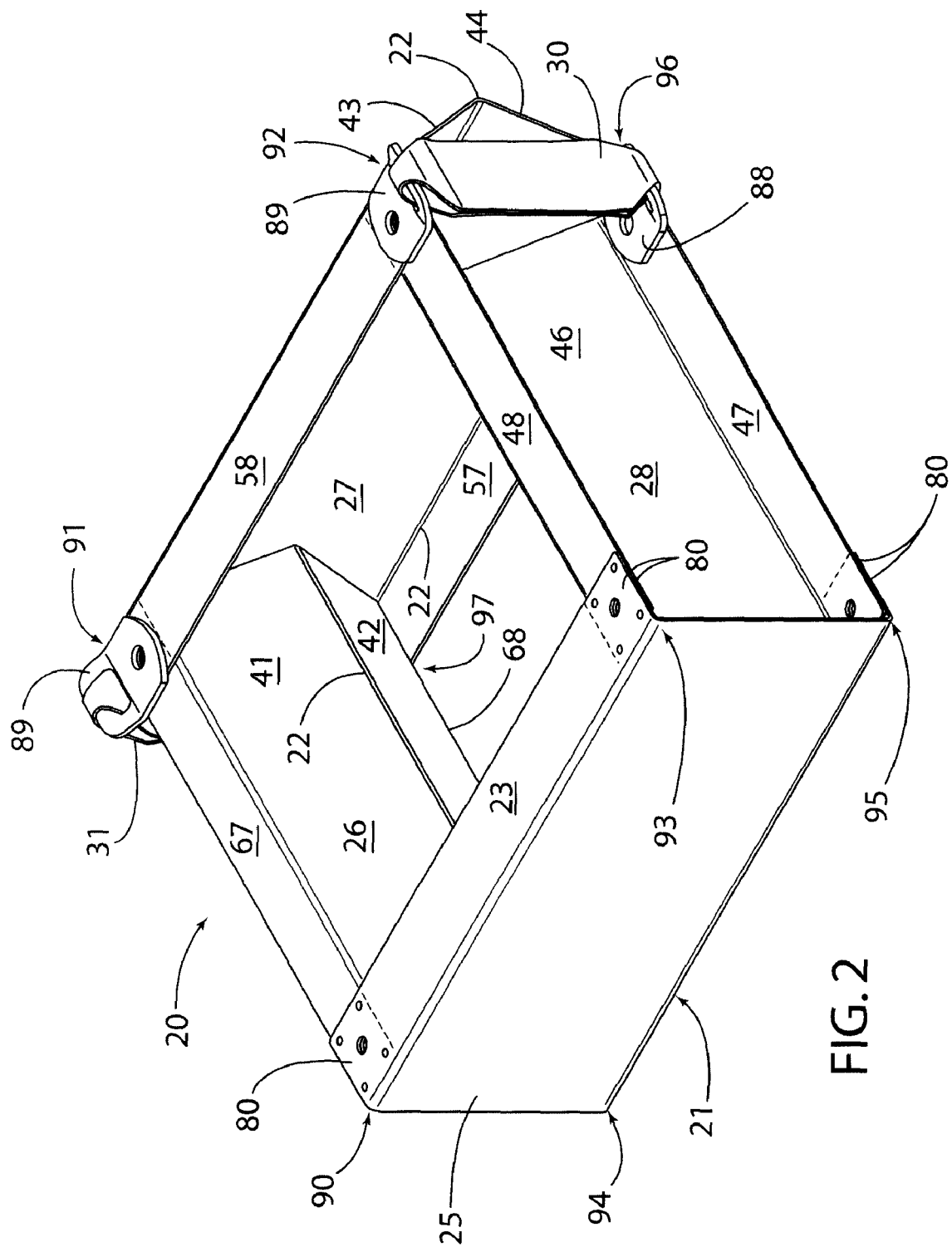
FIG. 2 is an isolated isometric view of the blast mitigation device of FIG. 1.
Figure 3:
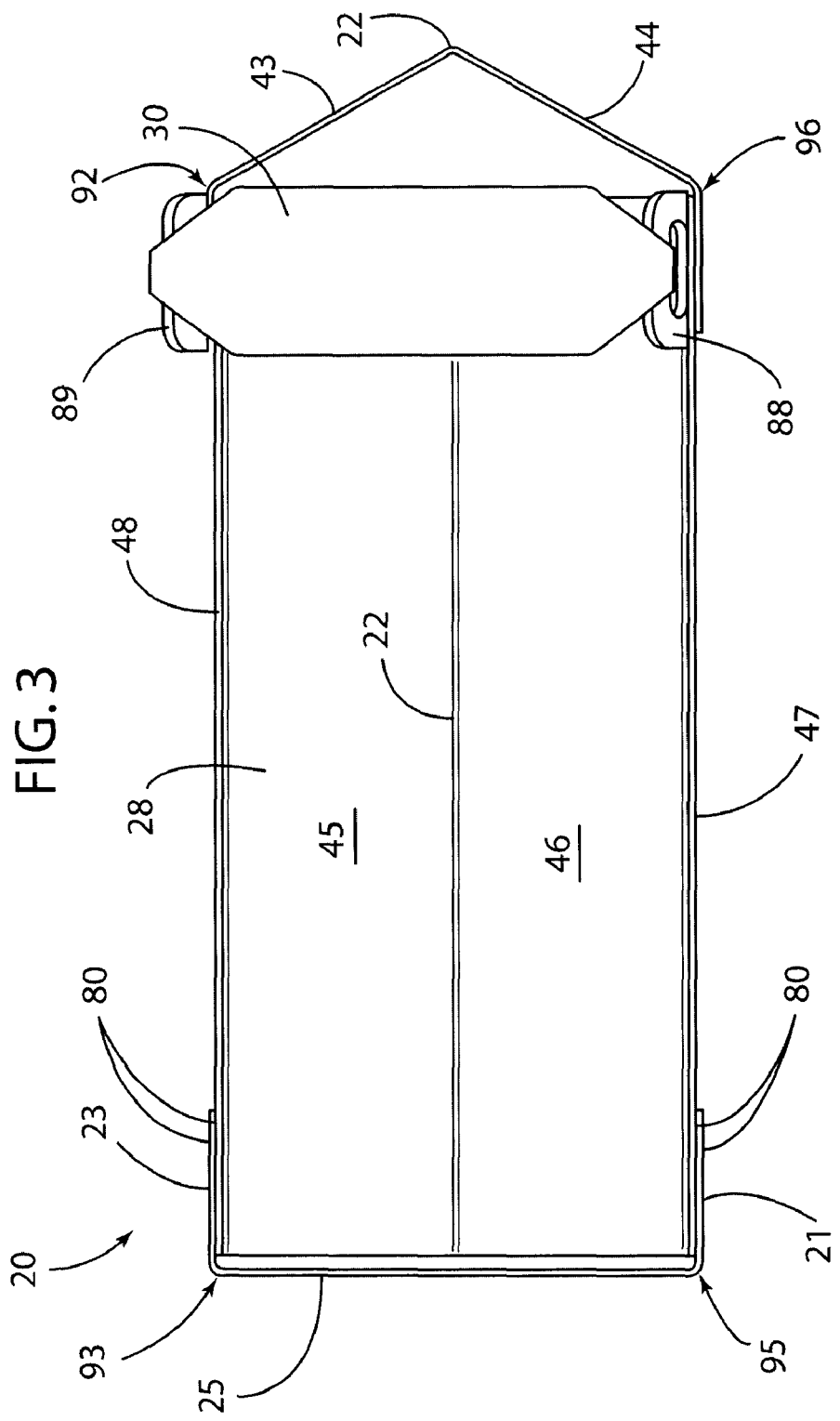
FIG. 3 is a side view of the blast mitigation device.

It is highly desirable for such seat assemblies to be able to withstand loading from blast events and to resist separation of the seat module and blast box from the floor of the motor vehicle during front impacts such as vehicle collisions. Therefore, the blast box 20 is adapted to be secured to the vehicle floor and is shown in FIG. 2 to comprise a front wall 25, right wall 26 (as viewed from an occupant of the seat assembly), back wall 27 and left wall 28. The left wall 28 has a pair of angled plates 45 (seen in FIG. 3) and 46 separated with a crease 22. In a similar manner, the right wall is provided with a pair of angled plates 41, 42 and crease 22 (shown best in FIG. 2), and the back wall is provided with a pair of angled plates 43, 44 and crease 22 (shown best in FIG. 3). In the event of a blast or other high energy transfer event the left wall, right wall and back wall each deform at the corresponding crease 22, and thereby absorb significant amounts of energy, protecting the occupant of the seat assembly.

Preferably, as shown in the Figs., the front wall does not have a crease. Thus, a crumple zone is restricted to the back wall 27, left wall 28, and right wall 26 and the crumple zone is in this sense remote from the front wall. A rigid front wall helps protect the occupant of the seat by forcing the occupant back into the seat.

In accordance with a highly advantageous feature, a front impact dislocation resistance device 30 (or 130 in FIGS. 6-8) helps resist vertical separation of the blast box 20 from the floor as well as resist separation of the seat base from the blast mitigation device. In the embodiment shown in FIGS. 1-5 a tether 30 is used; in the embodiment shown in FIGS. 6-8, a rod 130 is used. The tether or rod helps the seat assembly meet FVMSS requirements. Other front impact dislocation resistance devices will be readily apparent to those skilled in the art given the benefit of this disclosure.

Figure 4:
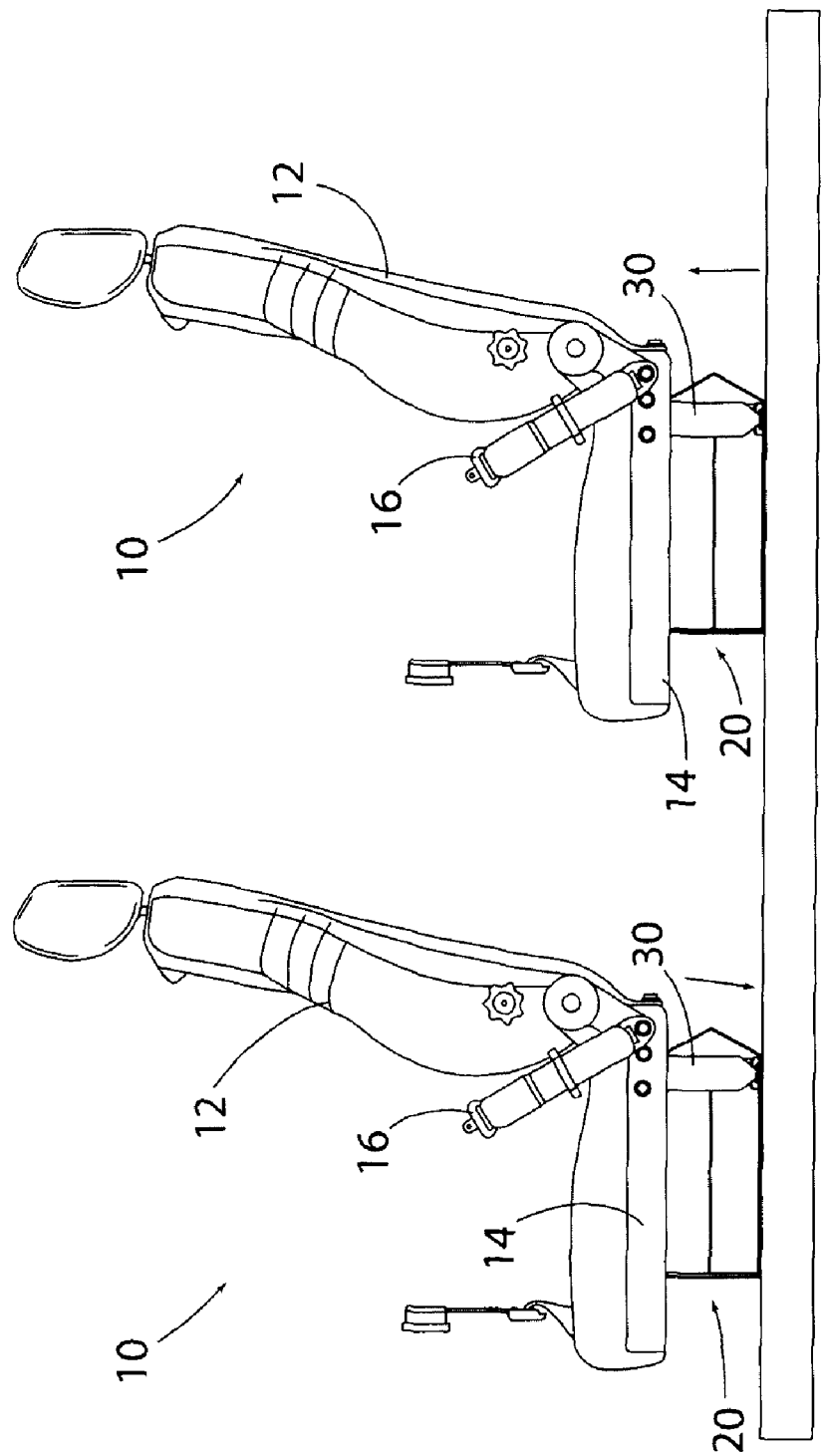
FIG. 4 shows side views of the seat assembly of FIG. 1 showing forces generated during a blast event and a regulatory agency test for a front end collision, or for a front end collision.
Figure 5:
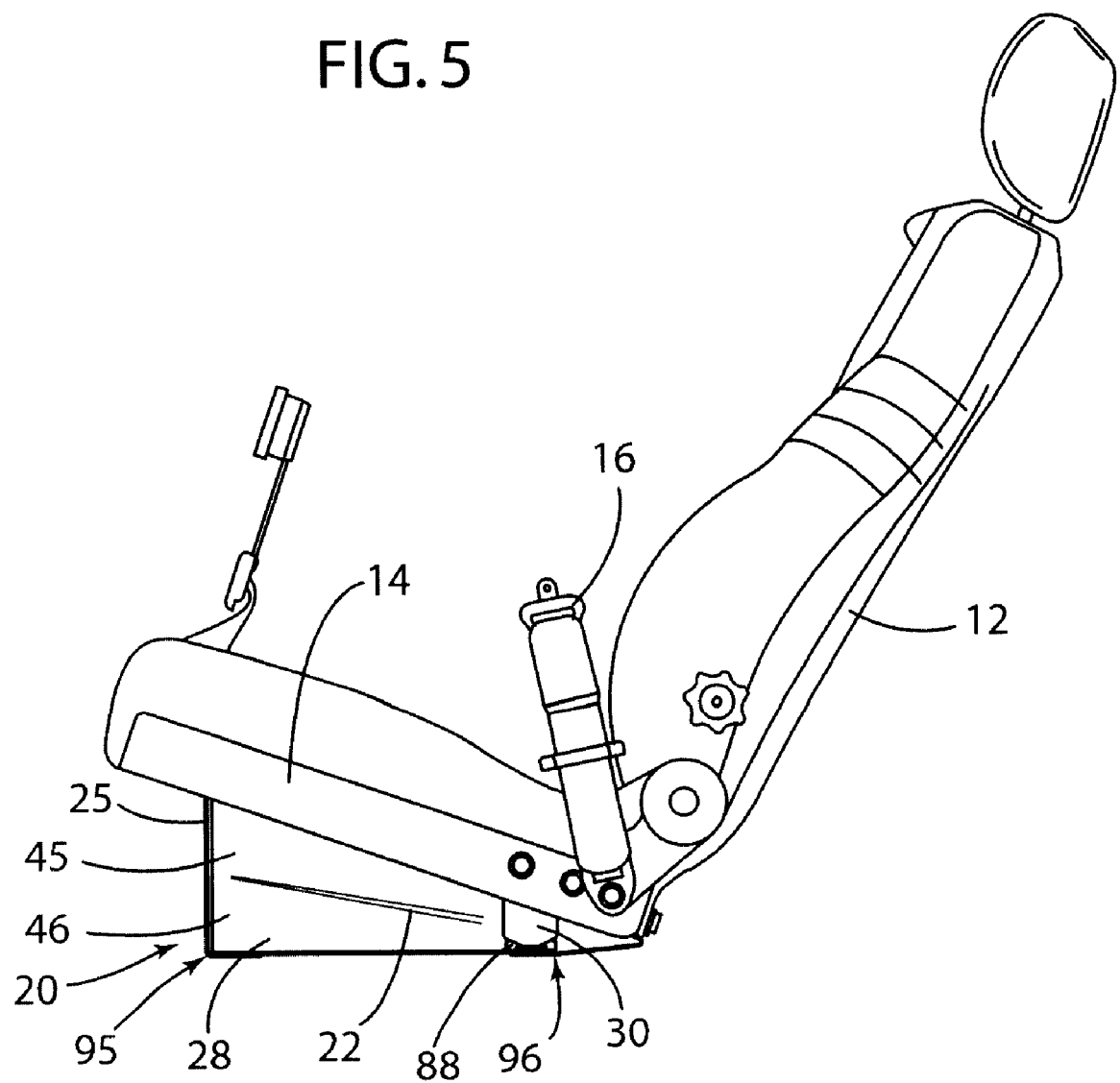
FIG. 5 shows the blast mitigation device absorbing energy from a blast.
Figure 6:
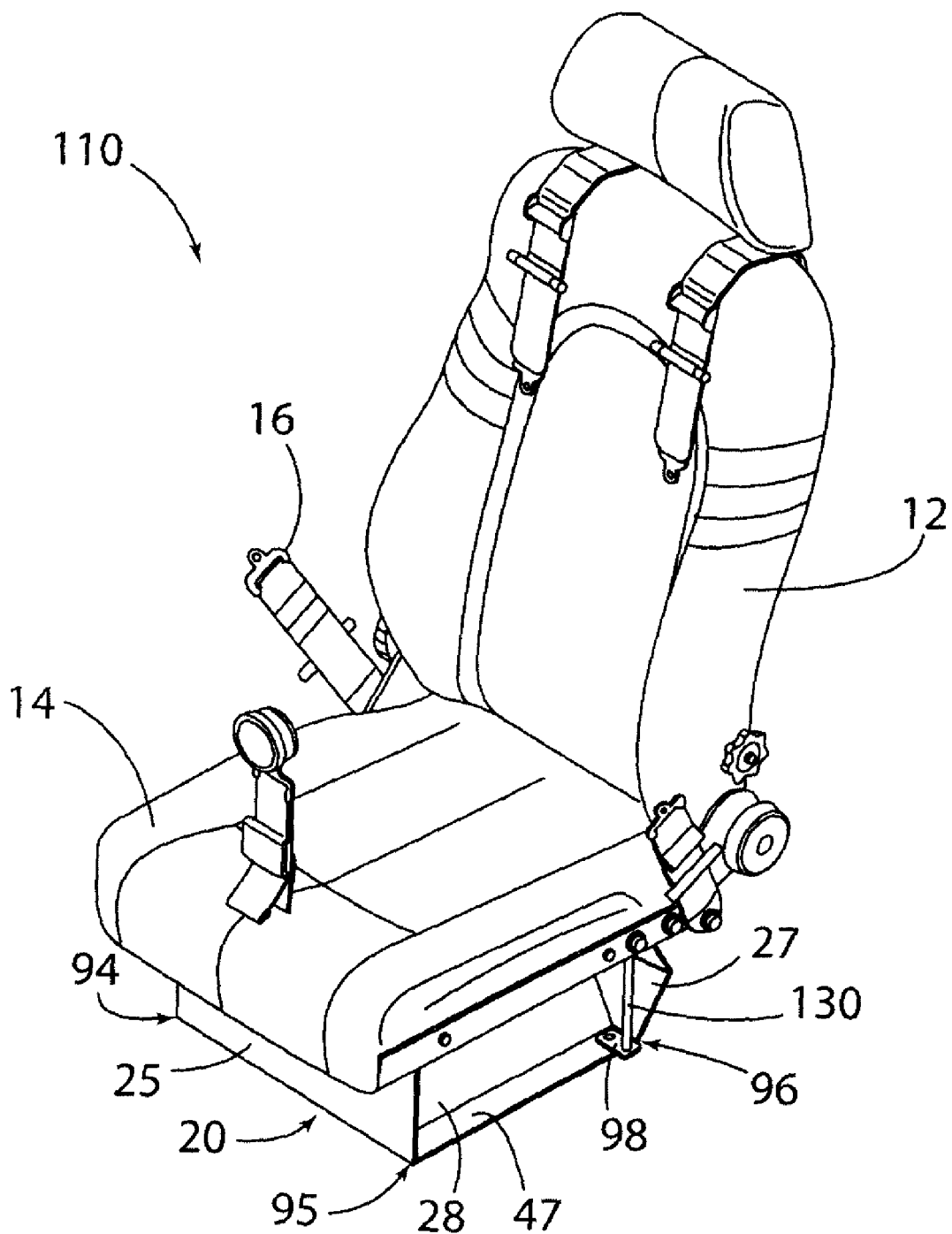
FIG. 6 is an isometric view of an alternate embodiment of a seat assembly showing an alternate front impact dislocation resistance device.

FIG. 4 show forces generated during a blast event and a regulatory agency (FMVSS) test representing a front end collision. During a blast event, the blast box 20 or crush box slows the acceleration of the seat module by collapsing. The relative forces are shown by the downward directed arrow on the left side of FIG. 4. During an FMVSS test, force is applied to the seat as shown on the right side of FIG. 4 with the upward facing arrow. This force will cause the blast/crush box to expand or pull apart. The tether 30 or rigid support 130 will then become tensioned and distribute force back to the vehicle floor. As noted above, during a blast event only the back of the crush box collapses, forcing the occupant back into the seat. FIG. 5 shows an example of the kind of deformation resulting from blast energy transfer to the crumple zone of the blast box 20. During a FMVSS test the rigid front resists deformation, helping to prevent the seat and the occupant from moving forward in the vehicle.

One or more front impact dislocation devices 30 (or 130) may be used. As shown in the Figs., a pair is used in both embodiments; a first device positioned on and attached to the left wall 28 and a second device positioned on and attached to the right wall 26. Further, in accordance with the embodiment shown in the Figs., the first device and the second device are each mounted on the back wall 27. Each of walls, the front wall 25, left wall 28, right wall 26, and left back wall 27 have a pair of horizontal flanges 23, 21; 48, 47; 67, 68 (not shown, but preferably a mirror image of 47); and 58, 57, respectively, extending parallel to the seat base 14, and each of the horizontal flanges define a pair of mounting surfaces 80. The mounting surfaces 80 receive corresponding mounting surfaces from one of the other horizontal flanges near corners 90, 91, 92, 93. For example, horizontal flanges 23 and 48 have mounting surfaces 80 which meet at corner 93. Corresponding corners 94; 95, 96 and 97 (essentially a mirror image of corner 96) are positioned on the underside of the blast box 20. A fastener or weld or both may be used to secure the walls together at the mounting surfaces.

Figure 7:
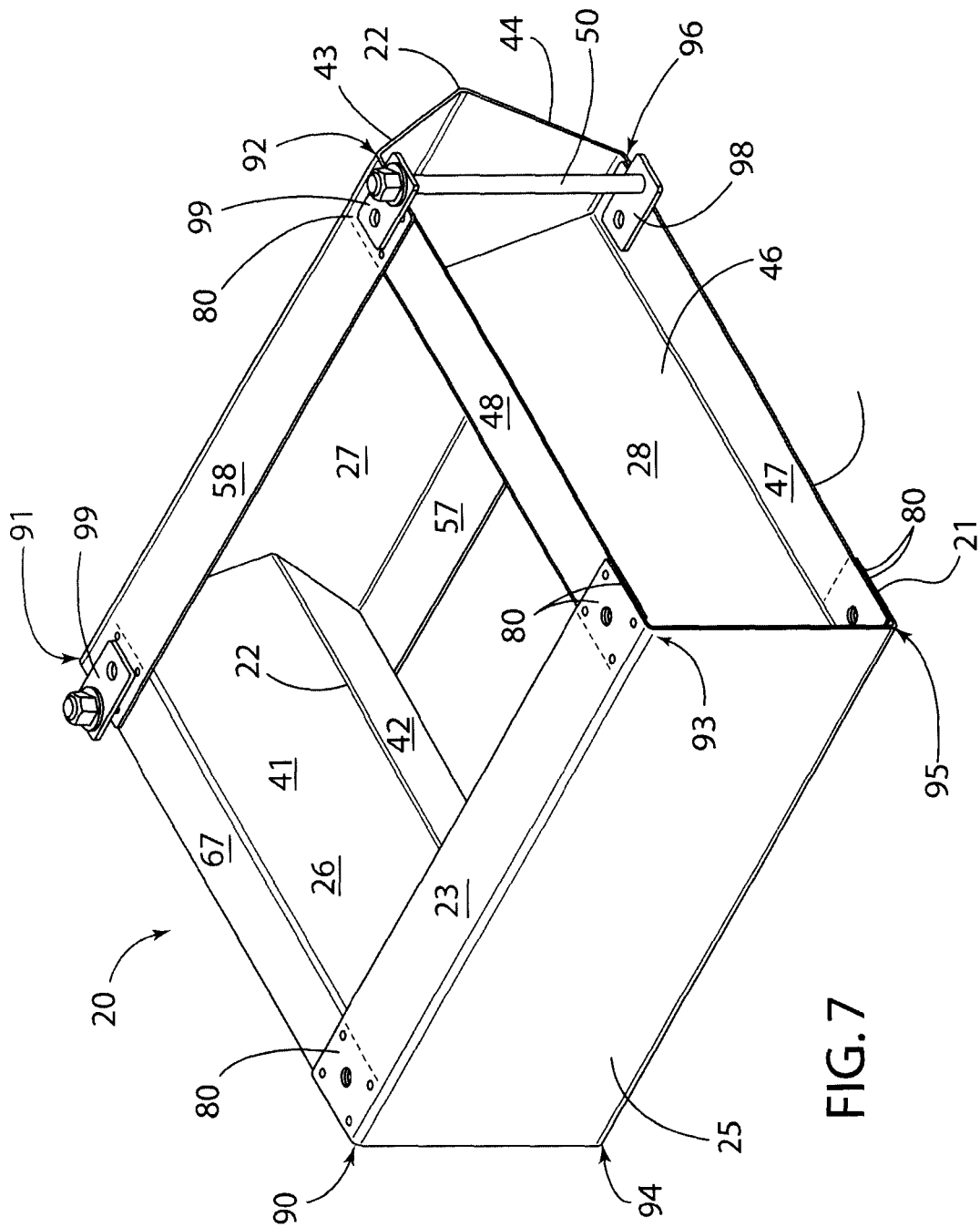
FIG. 7 is an isolated isometric view of the blast mitigation device of FIG. 6.
Figure 8:
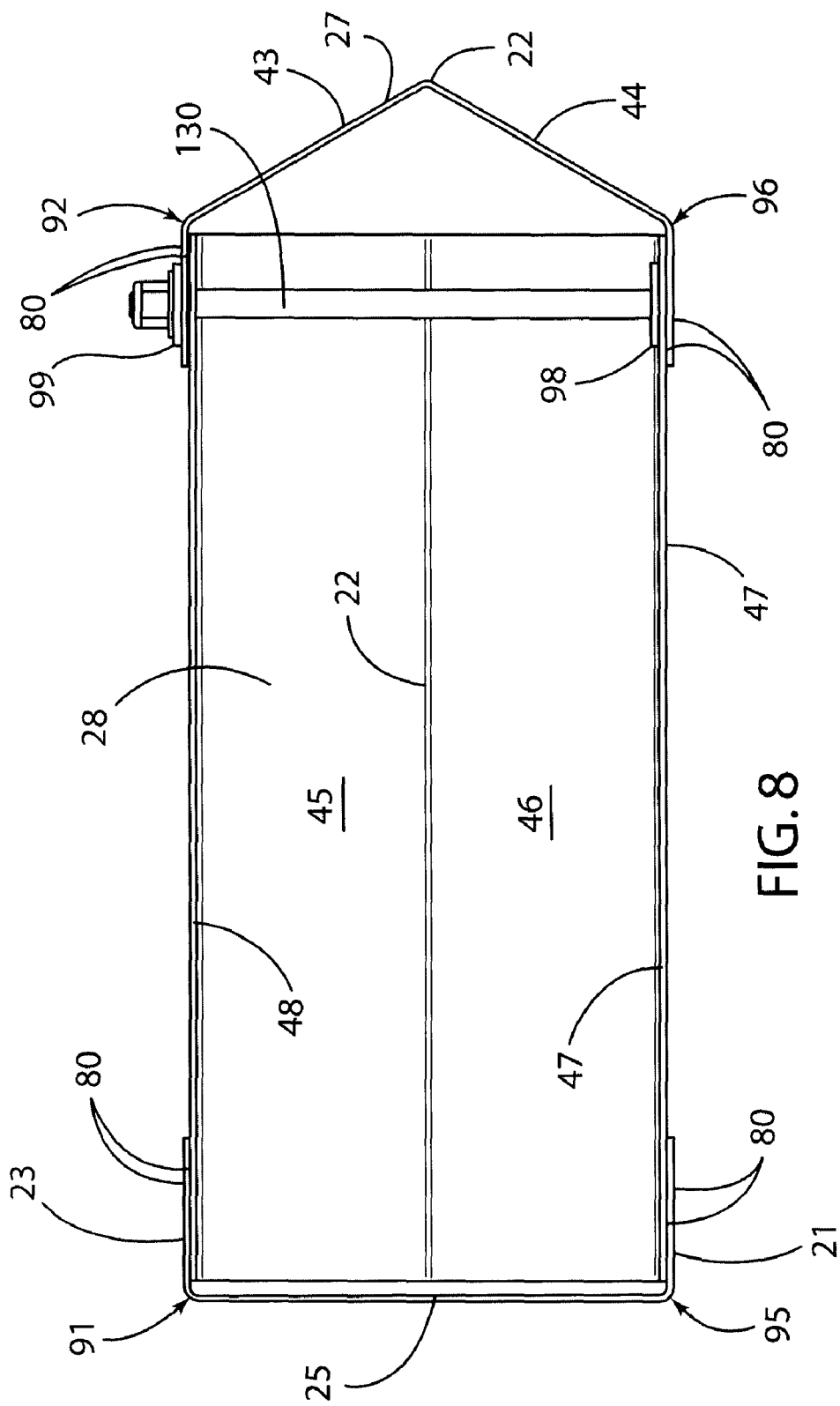
FIG. 8 is a side view of the blast mitigation device.

In addition to connecting the walls together to form the blast box, the mounting surfaces 80 also cooperate with one another to act as suitable locations to secure the front impact dislocation resistance device 30 or 130 to the blast box. Brackets 88, 89 (along with fasteners, welds or both, not shown) at the mounting surfaces 80 secure the tether 30 to the blast box 20 as shown in FIG. 2, for example. In a similar manner brackets 98 and 99 secure rod 130 to the blast box, as shown in FIG. 7, for example.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat assembly having a front and a back and adapted to be attached to a floor comprising, in combination:
    a seat base and a seat back attached to the seat base;
    a seat belt mechanism attached to the seat base and free of the floor;
    a blast mitigation device attached to the seat base and adapted to be secured to the floor, wherein the blast mitigation device has a crumple zone which absorbs energy in the event of a blast, wherein the blast mitigation device comprises a blast box including a rigid front wall, a deformable left wall, a deformable right wall and a deformable back wall; wherein the left wall, right wall and back wall are each formed as a pair of angled plates separated with a crease, and in the event of a blast the left walk right wall and bark wall each deform at the corresponding crease and wherein the rigid front wall does not have a crease and resists deformation; and
    a front impact dislocation resistance device mounted on the blast mitigation device with a pair of brackets, wherein the front impact dislocation resistance device acts to resist separation of the seat base from the blast mitigation device.

2. The seat assembly of claim 1 wherein the front impact dislocation resistance device comprises one of a tether and a rigid support.

3. The seat assembly of claim 2 wherein the blast mitigation device has a left wall and a right wall, and the front impact dislocation resistance device comprises a first device and a second device, with the first device positioned on the left wall and the second device positioned on the right wall.

4. The seat assembly of claim 3 wherein the first device and the second device are each mounted on the back wall.

5. The seat assembly of claim 1 wherein the crumple zone is restricted to the left wall, the right wall and the back wall.

6. The seat assembly of claim 1 wherein the crumple zone is remote from the front wall so that during the blast a back portion of the blast box collapses forcing the occupant back into the seat back and seat base in a reclined position.

7. The scat assembly of claim 1 wherein the front impact dislocation resistance device is located on the blast box attached to the back wall.

8. The seat assembly of claim 1 wherein each of the front wall, left wall, right wall and back wall have a pair of horizontal flanges extending parallel to the seat base, and each of the horizontal flanges define mounting surfaces adapted to receive corresponding mounting surfaces from one of the other horizontal flanges, wherein the front wall is an integral single piece with its pair of upper and lower horizontal flanges.

9. A seat assembly having a front and a back and adapted to be attached to a floor comprising, in combination:

a seat having a seat base and a seat back attached to the seat base;

a seat belt mechanism attached to the seat base and free of the floor;

a collapsible blast box attached to the seat base and adapted to be secured to the floor, the blast box includes a rigid sole front wall that resists deformation, a deformable left wall, a deformable right wall and a deformable back wall, wherein the blast box has a crumple zone restricted to the left wall, the right wall and the back wall that absorbs energy in the event of a blast and wherein the left wall, right wall and back wall are each formed as a pair of angled plates separated with a crease, and in the event of a blast the left wall, right wall and back wall each deform at the corresponding crease and wherein the right front wall does not have a crease and resists deformation.

10. The seat assembly of claim 9 wherein the crumple zone is remote from the front wall so that during the blast a back portion of the blast box collapses forcing the occupant back into the seat in a reclined position.

* * * * *

UNITED STATES PATENT AND TRADEMARK OFFICE
CERTIFICATE OF CORRECTION

PATENT NO. : 8,303,034 B2  
APPLICATION NO. : 12/565814  
DATED : November 6, 2012  
INVENTOR(S) : Matthew C. Gross et al.

Page 1 of 1

It is certified that error appears in the above-identified patent and that said Letters Patent is hereby corrected as shown below:

In Claim 1, Column 4, line 31, "walk" should read --wall--; and "bark" should read --back--.

In Claim 7, Column 4, line 55, "scat" should read --seat--.

In Claim 9, Column 6, line 4, "right" should read --rigid--.

Signed and Sealed this
Eighteenth Day of December, 2012

David J. Kappos
*Director of the United States Patent and Trademark Office*